United States Patent [19]
Rice

[11] Patent Number: 5,943,040
[45] Date of Patent: Aug. 24, 1999

[54] GRAPHICAL IMAGE REFORMATTING

[75] Inventor: Daniel S. Rice, Oakland, Calif.

[73] Assignee: Sun Microsystems, Inc., Palo Alto, Calif.

[21] Appl. No.: 08/884,098

[22] Filed: Jun. 27, 1997

[51] Int. Cl.[6] .................................................. G06T 1/20
[52] U.S. Cl. ........................... 345/154; 345/153; 345/155; 348/441
[58] Field of Search ...................................... 345/153, 154, 345/155, 203, 516, 517; 348/453, 455, 441

[56] References Cited

U.S. PATENT DOCUMENTS

| | | | |
|---|---|---|---|
| 5,231,385 | 7/1993 | Gengler et al. | 345/153 |
| 5,260,695 | 11/1993 | Gengler et al. | 345/153 |
| 5,798,753 | 8/1998 | Zhou et al. | 345/154 |

*Primary Examiner*—Mark K. Zimmerman
*Assistant Examiner*—Vincent E Kovalick
*Attorney, Agent, or Firm*—James D. Ivey

[57] ABSTRACT

A number of multiple-band pixels are stored in a number of data words and the multiple-band pixels are merged and sorted such that all components of each band of the pixels are stored contiguously and in the order in which the multiple-band pixels are originally stored in the data words. As a result, the pixels are converted from an interleaved format to a planar format. The data words are essentially divided in half and the halves are merged such that the pixel components are interleaved in a number of intermediate data words. By repeatedly dividing the intermediate data words in half and merging the respective halves, the components of all the pixels corresponding to each band are stored contiguously in a number of data words. The contiguous components of each band are sorted such that the components of each band are stored in the order in which the multiple-band pixels are originally stored in the data words. For example, the contiguous components can be sorted using the same merge operation used to sift the components of the respective bands into contiguous storage locations.

9 Claims, 6 Drawing Sheets

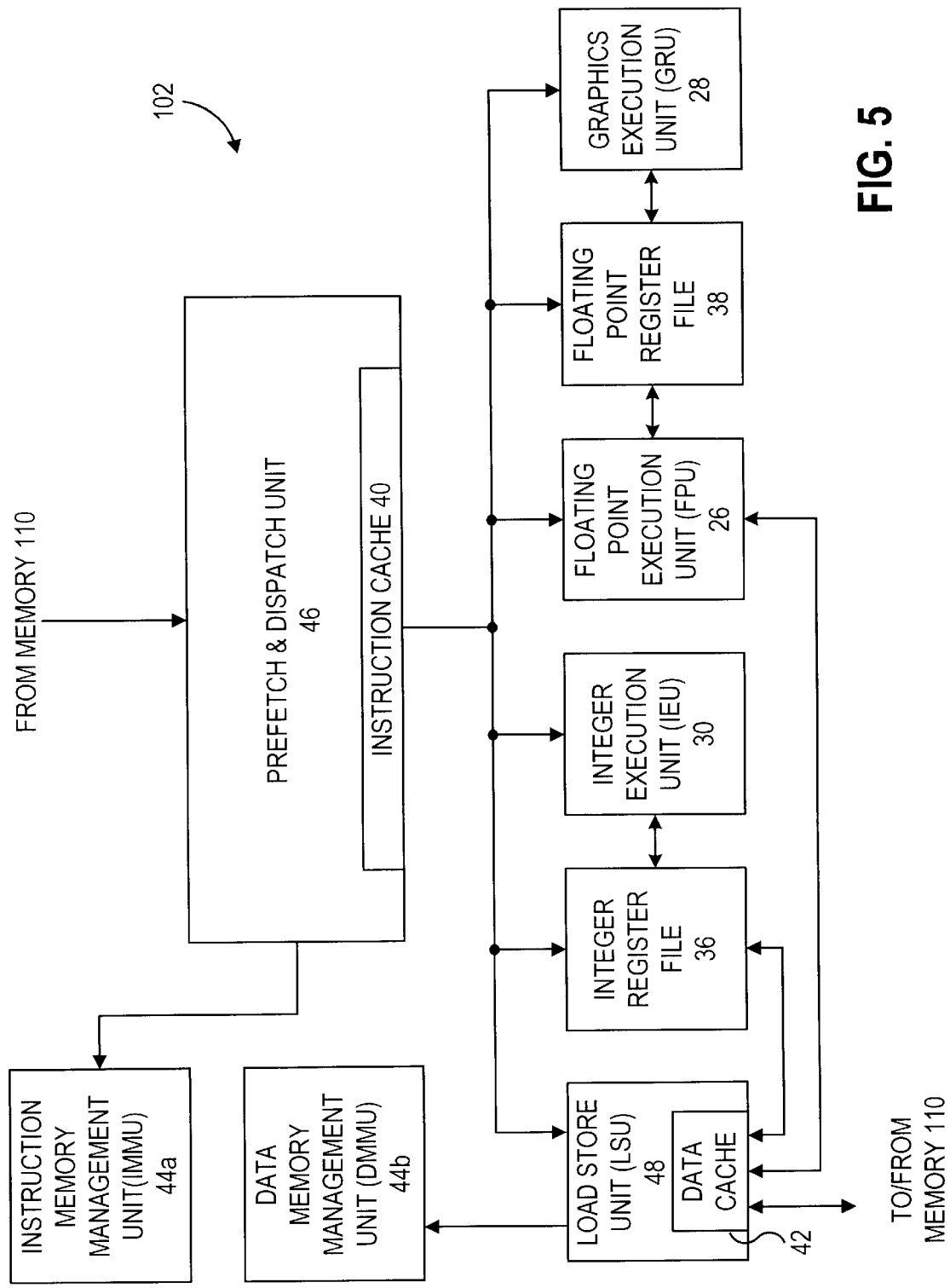

GRAPHICAL IMAGE REFORMATTING

FIELD OF THE INVENTION

The present invention relates to graphical image processing in a computer system and, in particular, to a particularly efficient mechanism for interleaving individual bands of a multiple-band image buffer into multiple separate bands of a graphical image.

BACKGROUND OF THE INVENTION

In most computer graphics display devices in use today, color graphical images to be displayed must be in either (i) a 4-band, interleaved format in which four contiguous data components specify four respective components of a single pixel of the graphical image or (ii) in a 3- or 4-band planar format in which each band of respective pixels are stored separately. For example, the interleaved format can include four contiguous bytes of data which specify red, green, and blue components, respectively, of a single pixel. Similarly, the planar format can include data representing all red components of the pixels of a graphical image stored contiguously in a first buffer, data representing all green components of the pixels stored contiguously in a first buffer, and data representing all blue components of the pixels stored contiguously in a first buffer.

It is frequently desirable to convert a graphical image between interleaved and planar formats. It is common for graphical images produced today to include approximately one million pixels. For example, common sizes for graphical images include rectangular grids of 1024-by-768 pixels or 1280-by-1024 pixels, i.e., 786,432 and 1,310,720 pixels, respectively. To produce three separate buffers of respective bands of a graphical image from a single buffer containing a three-band graphical image in one conventional technique requires (i) approximately 750,000 read operations to read the pixels in the interleaved format, (ii) approximately two million shift operations and 8,250,000 logical operations to separate the respective components of each pixel, and (iii) approximately 750,000 write operations to store each band of each pixel in a respective single-band buffer.

Because of the significant computer system resources required for such graphical image reformatting, a need persists in the industry for ever increasing efficiency in conversion of graphical images from a single buffer of multiple bands of the graphical image to multiple buffers of respective single bands of the graphical image.

SUMMARY OF THE INVENTION

In accordance with the present invention, a number of multiple-band pixels are stored in a number of data words and the multiple-band pixels are merged and sorted such that all components of each band of the pixels are stored contiguously and in the order in which the multiple-band pixels are originally stored in the data words. As a result, the pixels are converted from an interleaved format to a planar format. The data words are essentially divided in half and the halves are merged such that the pixel components are interleaved in a number of intermediate data words. By repeatedly dividing the intermediate data words in half and merging the respective halves, the components of all the pixels corresponding to each band are stored contiguously in a number of data words. The contiguous components of each band are sorted such that the components of each band are stored in the order in which the multiple-band pixels are originally stored in the data words. For example, the contiguous components can be sorted using the same merge operation used to sift the components of the respective bands into contiguous storage locations.

Once in contiguous storage locations, the sifted and sorted components of each band are written to respective buffers for each band. In this manner, sixteen (16) three-component pixels are converted from an interleaved format to a planar format using only six (6) read operations to store all 48 components in six 8-byte data words, 24 merge operations to sift and sort the components of each band into contiguous bytes of the six (6) 8-byte data words, and six (6) write operations to store the sifted and sorted pixel components. By comparison, conventional mechanisms for converting sixteen (16) three-component pixels from an interleaved to a planar format generally use twelve read operations to read the 48 bytes which represent the sixteen pixels, 32 shift operations and 84 logical operations to separate the respective components of the sixteen pixels, and twelve write operations to store the sixteen pixels in the planar format. In a currently available UltraSPARC workstation computer available from Sun Microsystem, Inc. of Mountain View, Calif., such a conventional technique requires 58 instruction cycles in comparison to 24 instruction cycles requires for the technique according to the present invention. Accordingly, conventional techniques require approximately 240% as much processing time as do techniques according to the present invention.

BRIEF DESCRIPTION OF THE DRAWINGS

FIG. 5 is a block diagram of the computer processor of FIG. 1 in greater detail.

DETAILED DESCRIPTION

Figure 1:
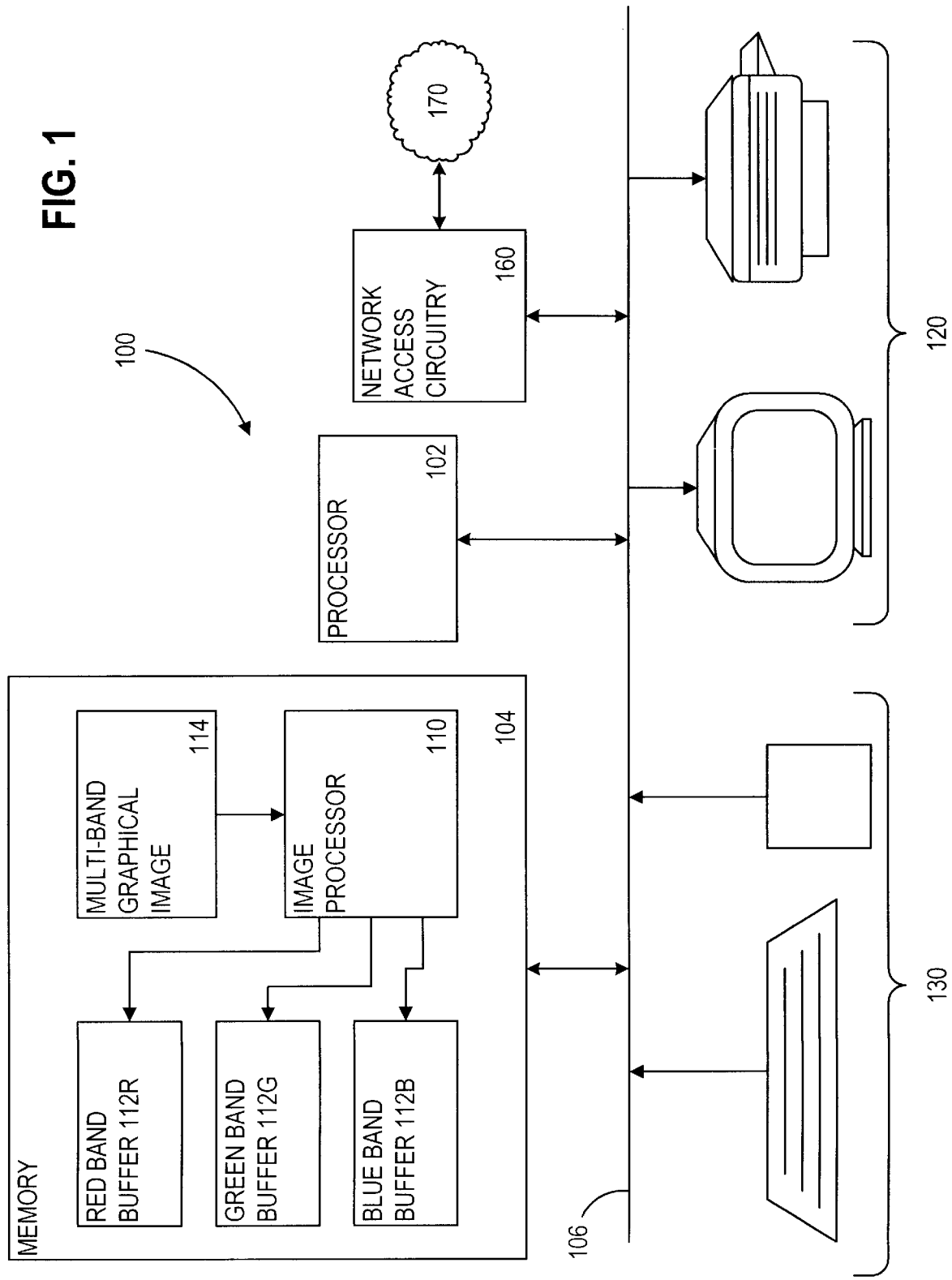
FIG. 1 is a block diagram of a computer system which includes an image processor which builds separate, single-band pixel component buffers from a multiple-band pixel buffer in accordance with the present invention.

In accordance with the present invention, a format converter reads a number of multiple-band pixels from a graphical image into a temporary buffer and merges various portions of the temporary buffer to separate and sort the individual components of the multiple-band pixels and stores the separated and sorted components into respective buffers.

Hardware Components of the Image Processing System

To facilitate appreciation of the present invention, the hardware components of the disclosed graphical image reformatting system are briefly described. Computer system 100 (FIG. 1) includes a processor 102 and memory 104 which is coupled to processor 102 through an interconnect 106. Interconnect 106 can be generally any interconnect mechanism for computer system components and can be, e.g., a bus, a crossbar, a mesh, a torus, or a hypercube. Processor 102 fetches from memory 104 computer instructions and executes the fetched computer instructions. Processor 102 also reads data from and writes data to memory 104 and sends data and control signals through interconnect 106 to one or more computer display devices 120 in accordance with fetched and executed computer instructions. Processor 102 is described in greater detail below.

Memory 104 can include any type of computer memory and can include, without limitation, randomly accessible memory (RAM), read-only memory (ROM), and storage devices which include storage media such as magnetic and/or optical disks. Memory 104 includes an image processor 110, which is a computer process executing within processor 102 from memory 104. A computer process is a collection of computer instructions and data which collectively define a task performed by computer system 100. As described more completely below, image processor 110 (i) reads multiple-band pixels from multi-band graphical image 114, (ii) interleaves the respective components of the pixels to separate red, green, and blue components of the pixels into an interleaved format, and (iii) stores the red, green, and blue components of the pixels in buffers 112R, 112G, and 112B, respectively.

Buffers 112R, 112G, and 112B and multi-band graphical image 114 are stored in memory 104. Multi-band graphical image 114 stores pixels of a graphical image in an interleaved format. Buffers 112R, 112G, and 112B each store data representing individual bands of the same pixels. For example, buffers 112R, 112G, and 112B store red, green, and blue components, respectively, of the same pixels. In other words, if a particular component of data at a particular location within buffer 112R represents a red band of a particular pixel, the particular component of data at the same location within buffers 112G and 112B represent green and blue bands, respectively, of the same pixel. Therefore, buffers 112R, 112G, and 112B collectively represent a single collection of multiple-band pixels.

Computer system 100 includes a number of computer display devices 120. Each of computer display devices 120 can be any type of computer display device including without limitation a printer, a cathode ray tube (CRT), a light-emitting diode (LED) display, or a liquid crystal display (LCD). Each of computer display devices 120 receives from processor 102 control signals and data and, in response to such control signals, displays the received data. Computer display devices 120, and the control thereof by processor 102, are conventional.

Planar to Interleaved Reformatting

Figure 2:
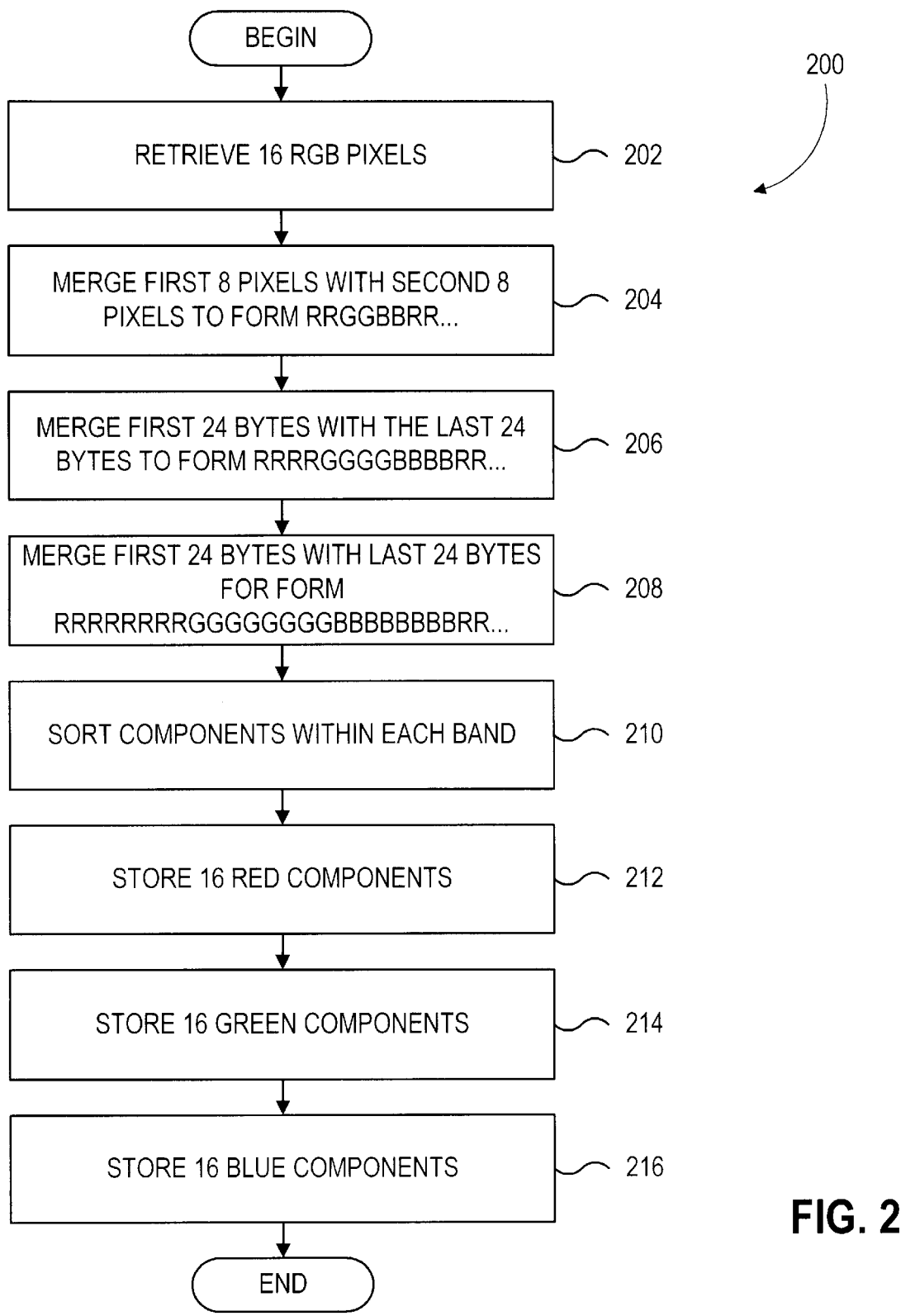
FIG. 2 is a logic flow diagram illustrating the construction of separate, single-band pixel component buffers from a multiple-band pixel buffer by the image processor of FIG. 1 in accordance with the present invention.

The construction or multiple single-band buffers 112R, 112G, and 112B from multi-band graphical image 114 by image processor 110 is illustrated as logic flow diagram 200 FIG. 2). In logic flow diagram 200 which image processor 110 (FIG. 1) converts sixteen (16) pixels from an interleaved format to a planar format. For each sixteen (16) of the multiple-band pixels of multi-band graphical image 114, image processor 110 performs the steps of logic flow diagram 200 (FIG. 2).

Processing according to logic flow diagram 200 begins with step 202. In step 202, image processor 110 (FIG. 1) reads sixteen (16) multiple-band pixels from multi-band graphical image 114. In one embodiment, the multiple band pixels have three components, e.g., red, green, and blue components, each of which is one byte in length. In this embodiment, processor 102 performs a read operation in which eight contiguous bytes of data can be read from memory 104. Therefore, all sixteen (16) pixels are read in six (6) such read operations. In reading the eight contiguous bytes, image processor 110 reads sixteen (16) contiguous bytes and and performs a data alignment operation which shifts the read data such that the first byte of the targeted eight contiguous bytes is aligned on an eight-byte boundary. In a preferred embodiment, image processor 110 (FIG. 1) determines whether the sixteen (16) contiguous bytes of data read in step 202 (FIG. 2) are already aligned on an eight-byte boundary prior performing the data alignment operation. If the sixteen bytes of data are already so aligned, image processor 110 (FIG. 1) does not perform the data alignment operation and stores all sixteen bytes thereby obviating a subsequent read operation.

Since each of the pixels has three (3) components, the sixteen (16) pixels include a total of 48 bytes. Image processor 110 stores the sixteen (16) contiguous pixels in six (6) 8-byte words, each half of which is separately addressable. Specifically, image processor 110 includes double data words 302A-F, which include long words 302A1-2, 302B1-2, 302C1-2, 302D1-2, 302E1-2, and 302F1-2, respectively. The contents of long words 302A1-2, 302B1-2, 302C1-2, 302D1-2, 302E1-2, and 302F1-2 are shown in the following table.

TABLE A

| 302A1 | R0  | G0  | B0  | R1  | 302A2 | G1  | B1  | R2  | G2  |
|-------|-----|-----|-----|-----|-------|-----|-----|-----|-----|
| 302B1 | B2  | R3  | G3  | B3  | 302B2 | R4  | G4  | B4  | R5  |
| 302C1 | G5  | B5  | R6  | G6  | 302C2 | B6  | R7  | G7  | B7  |
| 302D1 | R8  | G8  | B8  | R9  | 302D2 | G9  | B9  | R10 | G10 |
| 302E1 | B10 | R11 | G11 | B11 | 302E2 | R12 | G12 | B12 | R13 |
| 302F2 | G13 | B13 | R14 | G14 | 302F2 | B14 | R15 | G15 | B15 |

In Table A, Ri, Gi, and Bi refer respectively to the red, green, and blue components of pixel i, where i is an integer between zero and fifteen and identifies one of the sixteen pixels read in step 202. As shown in Table A, words 302A-F store the sixteen retrieved pixels in an interleaved format.

Figures 3, 3B:
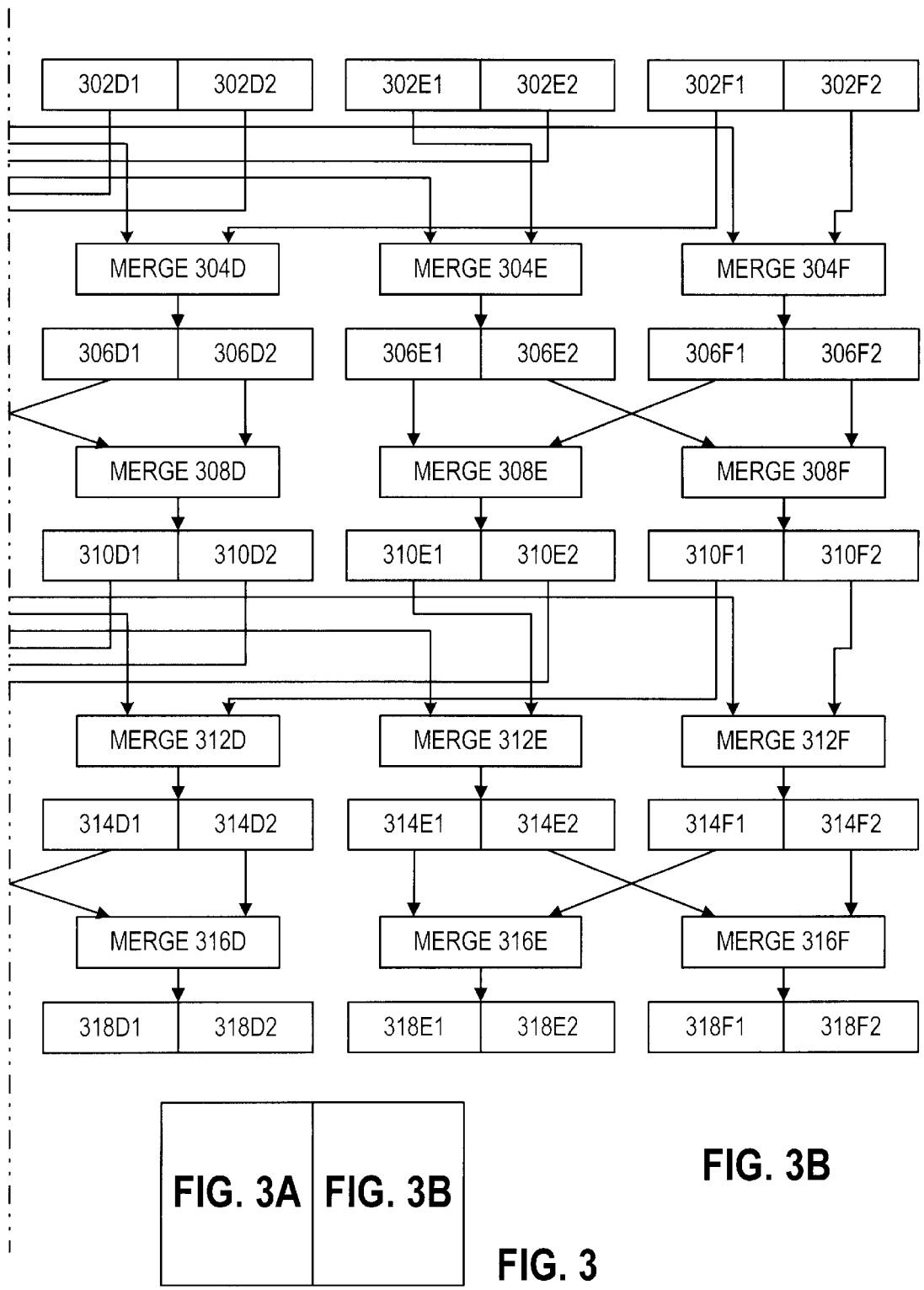
FIG. 3 is a block diagram illustrating merge operations used by the image processor of FIG. 1 to construct single-band pixel component buffers from a multiple-band pixel buffer in accordance with the present invention.
Figure 3A:
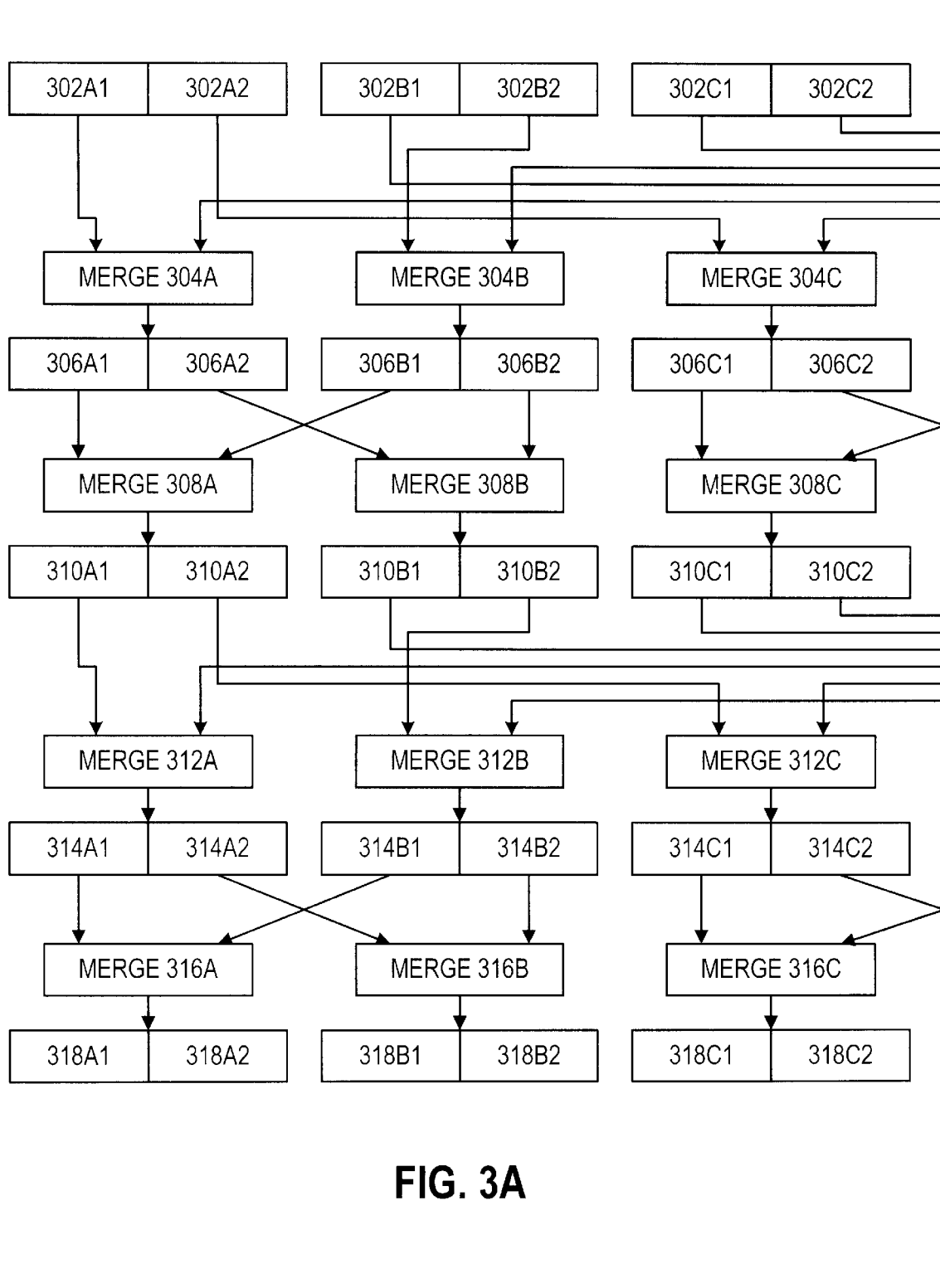
Figure 4:
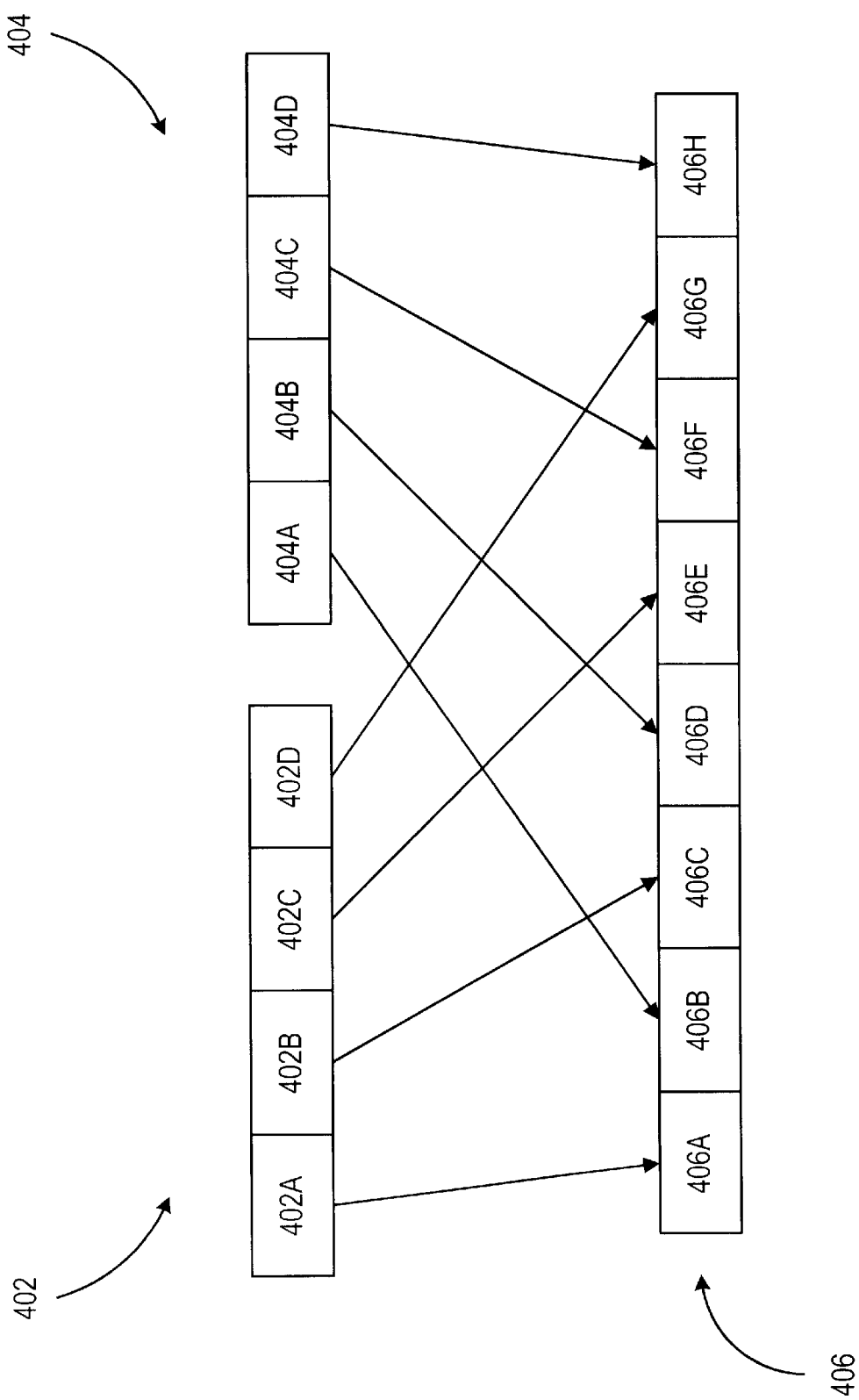
FIG. 4 is a block diagram illustrating a merge operation performed by a computer processor of FIG. 1.

Processing transfers from step 202 (FIG. 2) to step 204 in which image processor 110 merges the first eight pixels as stored in words 302A-C with the last eight pixels stored in words 302D-F. Image processor 110 performs a PMERGE operation which is performed by processor 102 FIG. 1) and is illustrated in FIG. 4. Data word 402 is 32-bits in length and includes four partitioned bytes 402A-D. Similarly, data word 404 is 32-bits in length and includes four partitioned bytes 404A-D. The PMERGE operation interleaves respective bytes of data words 402 and 404 into a double data word 406 as shown. Double data word 406 is 64 bits in length and includes eight partitioned bytes 406A-H. The result of PMERGE operation 304A (FIG. 3) is double data word 306A which includes long words 306A1 and 306A2 which in turn include pixel components R0, R8, G0, G8 and pixel components B0, B8, R1, R9. The cumulative result of PMERGE operations 304A-F is shown in the following table.

TABLE B

| PMERGE | Merges | with | to Form |
|--------|--------|------|---------|
| 304A | 302A1 | 302D1 | 306A |
| 304B | 302B2 | 302E2 | 306B |
| 304C | 302A2 | 302D2 | 306C |
| 304D | 302C1 | 302F1 | 306D |
| 304E | 302B1 | 302E1 | 306E |
| 304F | 302C2 | 302F2 | 306F |

The result of PMERGE operations 304A-F performed in step 204 is shown in the following table which shows the values of long words 306A1-2, 306B1-2, 306C1-2, 306D1-2, 306E1-2, and 306F1-2 of double data words 306A-F, respectively.

TABLE C

| 306A1 | R0 | R8  | G0 | G8  | 306A2 | B0 | B8  | R1 | R9  |
|-------|----|-----|----|-----|-------|----|-----|----|-----|
| 306C1 | G1 | G9  | B1 | B9  | 306C2 | R2 | R10 | G2 | G10 |
| 306E1 | B2 | B10 | R3 | R11 | 306E2 | G3 | G11 | B3 | B11 |
| 306B1 | R4 | R12 | G4 | G12 | 306B2 | B4 | B12 | R5 | R13 |
| 306D1 | G5 | G13 | B5 | B13 | 306D2 | R6 | R14 | G6 | G14 |
| 306F1 | B6 | B14 | R7 | R15 | 306F2 | G7 | G15 | B7 | B15 |

As shown in Table C, the 48 bytes of the sixteen (16) three-component pixels are effectively divided in half and the respective halves are merged. The result is interleaving of respective components of the following pairs of pixels: (i) the first and ninth pixels, (ii) the second and tenth pixels, (iii) the third and eleventh pixels, (iv) the fourth and twelfth pixels, (v) the fifth and thirteenth pixels, (vi) the sixth and fourteenth pixels, (vii) the seventh and fifteenth pixels, and (viii) the eighth and sixteenth pixels. In other words, pairs of pixels which are separated by seven other pixels are interleaved in step 204 (FIG. 2).

Processing transfers to step 206 in which in which image processor 110 (FIG. 1) merges double data word 306A (FIG. 3) with double data word 306B using PMERGE operations 308A-B. In addition, image processor 110 (FIG. 1) merges double data words 306C-D and 304E-F using PMERGE operations 308C-D and 308E-F, respectively. The cumulative result of PMERGE operations 308A-F is shown in the following table.

TABLE D

| PMERGE | Merges | with | to Form |
|--------|--------|------|---------|
| 308A | 306A1 | 306B1 | 310A |
| 308B | 306A2 | 306B2 | 310B |
| 308C | 306C1 | 306D1 | 310C |
| 308D | 306C2 | 306D2 | 310D |
| 308E | 306E1 | 306F1 | 310E |
| 308F | 306E2 | 306F2 | 310F |

The result of PMERGE operations 308A-F performed in step 206 (FIG. 2) is shown in the following table which shows the values of long words 310A1-2, 310B1-2, 310C1-2, 310D1-2 301E1-2, and 310F1-2 of double data words 310A-F, respectively.

TABLE E

| 310A1 | R0 | R4 | R8  | R12 | 310A2 | G0 | G4 | G8  | G12 |
|-------|----|----|-----|-----|-------|----|----|-----|-----|
| 310B1 | B0 | B4 | B8  | B12 | 310B2 | R1 | R5 | R9  | R13 |
| 310C1 | G1 | G5 | G9  | G13 | 310C2 | B1 | B5 | B9  | B13 |
| 310D1 | R2 | R6 | R10 | R14 | 310D2 | G2 | G6 | G10 | G14 |
| 310E1 | B2 | B6 | B10 | B14 | 310E2 | R3 | R7 | R11 | R15 |
| 310F1 | G3 | G7 | G11 | G15 | 310F2 | B3 | B7 | B11 | B15 |

As shown in Table E, the 48 bytes of the sixteen (16) three-component pixels merged as shown in Table C are effectively divided in half and the respective halves are merged. The result is four groups of four pixels, each group stored in three long words in a planar format. Specifically, long words 312A1, 310A2, and 3120B1 store the first, fifth, ninth, and thirteenth pixels in a local planar format. The format is called local planar herein to indicate that only a subset of the sixteen pixels retrieved in step 202 are included in this planar representation. In addition, (i) long words 310B2, 310C1, and 310C2 store the second, sixth, tenth, and fourteenth pixels in the local planar format; (ii) long words 310D1, 310D2, and 310E1 store the third, seventh, eleventh, and fifteenth pixels in the local planar format; (iii) long words 310E2, 310F1, and 310F2 store the fourth, eighth, twelfth, and sixteenth pixels in the local planar format.

Processing transfers to step 208 (FIG. 2) in which in which image processor 110 (FIG. 1) merges (i) double data word 310A (FIG. 3) with double data word 310D using PMERGE operations 312A and 312C, (ii) double data word 310B with double data word 310E using PMERGE operations 312B and 312E, and (iii) double data word 310C with double data word 312F using PMERGE operations 312D and 312F. The cumulative result of PMERGE operations 312A-F is shown in the following table.

TABLE F

| PMERGE | Merges | with  | to Form |
|--------|--------|-------|---------|
| 312A | 310A1 | 310D1 | 314A |
| 312B | 310B2 | 310E2 | 314B |
| 312C | 310A2 | 310D2 | 314C |
| 312D | 310C1 | 310F1 | 314D |
| 312E | 310B1 | 310E1 | 314E |
| 312F | 310C2 | 310F2 | 314F |

The result of PMERGE operations 312A-F performed in step 208 (FIG. 2) is shown in the following table which shows the values of long words 314A1-2, 314B 1-2, 314C1-2, 314D1-2, 314E1-2, and 314F1-2 of double data words 314A-F, respectively.

TABLE G

| 314A1 | R0 | R2 | R4 | R6 | 314A2 | R8 | R10 | R12 | R14 |
|-------|----|----|----|----|-------|----|-----|-----|-----|
| 314B1 | R1 | R3 | R5 | R7 | 314B2 | R9 | R11 | R13 | R15 |
| 314C1 | G0 | G2 | G4 | G6 | 314C2 | G8 | G10 | G12 | G14 |
| 314D1 | G1 | G3 | G5 | G7 | 314D2 | G9 | G11 | G13 | G15 |
| 314E1 | B0 | B2 | B4 | B6 | 314E2 | B8 | B10 | B12 | B14 |
| 314F1 | B1 | B3 | B5 | B7 | 314F2 | B9 | B11 | B13 | B15 |

As shown in Table G, the 48 bytes of the sixteen (16) three-component pixels merged as shown in Table E are effectively divided in half and the respective halves are merged. The result is all sixteen pixels represented in a partial planar format. The planar format is partial in that the corresponding components of all sixteen pixels are adjacent to one another but are not properly ordered. Specifically, double data words 314A-B store the red components of all sixteen pixels but do not store them in the order retrieved in step 202 (FIG. 2). Similarly, double data words 314C-D (FIG. 3) store the green components of all sixteen pixels out of order, and double data words 314E-F store the blue components of all sixteen pixels out of order.

Processing transfers to step 210 (FIG. 2) in which in which image processor 110 (FIG. 1) merges (i) double data word 314A (FIG. 3) with double data word 314B using PMERGE operations 316A-B, (ii) double data word 314C with double data word 314D using PMERGE operations 316C-D, and (iii) double data word 310E with double data word 310F using PMERGE operations 316E-F. The cumulative result of PMERGE operations 316A-F is shown in the following table.

TABLE H

| PMERGE | Merges | with  | to Form |
|--------|--------|-------|---------|
| 316A | 314A1 | 314B1 | 318A |
| 316B | 314A2 | 314B2 | 318B |
| 316C | 314C1 | 314D1 | 318C |
| 316D | 314C2 | 314D2 | 318D |
| 316E | 314E1 | 314F1 | 318E |
| 316F | 314E2 | 314F2 | 318F |

The result of PMERGE operations 316A-F performed in step 208 (FIG. 2) is shown in the following table which shows the values of long words 318A1-2 (FIG. 3), 318B1-2, 318C1-2, 318D1-2, 318E1-2, and 318F1-2 of double data words 318A-F, respectively.

TABLE I

| 318A1 | R0 | R1 | R2 | R3 | 318A2 | R4 | R5 | R6 | R7 |
|---|---|---|---|---|---|---|---|---|---|
| 318B1 | R8 | R9 | R10 | R11 | 318B2 | R12 | R13 | R14 | R15 |
| 318C1 | G0 | G1 | G2 | G3 | 318C2 | G4 | G5 | G6 | G7 |
| 318D1 | G8 | G9 | G10 | G11 | 318D2 | G12 | G13 | G14 | G15 |
| 318E1 | B0 | B1 | B2 | B3 | 318E2 | B4 | B5 | B6 | B7 |
| 318F1 | B8 | B9 | B10 | B11 | 318F2 | B12 | B13 | B14 | B15 |

As shown in Table I, the 16 bytes of each of separate components of the sixteen (16) three-component pixels which are organized as shown in Table H are effectively divided into 8-byte halves and the respective halves are merged. The result is all sixteen pixels represented in a full planar format. The planar format is full in that the corresponding components of all sixteen pixels are adjacent to one another and are properly ordered. Specifically, double data words 314A-B store the red components of all sixteen pixels in the order retrieved in step 202 (FIG. 2). Similarly, double data words 314C-D store the green components of all sixteen pixels in order, and double data words 314E-F store the blue components of all sixteen pixels in order.

From step 210 (FIG. 2), processing transfers to steps 212–216 in which image processor 110 (FIG. 1) stores the separated components in respective ones of buffers 112R, 112G, and 112 B. Specifically, image processor 110 (i) stores sixteen (16) red components of the sixteen (16) pixels retrieved in step 202 (FIG. 2) from double data words 318A-B (FIG. 3) into red band buffer 112R (FIG. 1) in step 212 (FIG. 2), (ii) stores sixteen (16) green components of those sixteen (16) pixels from double data words 318C-D (FIG. 3) into green band buffer 112G (FIG. 1) in step 214 (FIG. 2), and (iii) stores sixteen (16) blue components of those sixteen (16) pixels from double data words 318E-F (FIG. 3) into blue band buffer 112G (FIG. 1) in step 216 (FIG. 2). Since processor 102 (FIG. 1) can write eight bytes in a single write operation, image processor 110 causes processor 102 to write each of double data words 318A-F in a single write operation. Therefore, only six (6) write operations are required to store the sixteen pixels in planar format in steps 212–216 (FIG. 2). After steps 212–216, processing according to logic flow diagram 200 completes.

Thus, according to logic flow diagram 200, sixteen (16) three-component pixels are converted from an interleaved format to a planar format using only six (6) read operations, 24 PMERGE operations, and six (6) write operations. By comparison, conventional mechanisms for converting sixteen (16) three-component pixels from an interleaved to a planar format generally use twelve read operations to read the 48 bytes which represent the sixteen pixels, 32 shift operations and 84 logical operations to separate the respective components of the sixteen pixels, and twelve write operations to store the converted pixels in the planar format. Thus, conventional techniques require approximately 240% as much processing time as do techniques according to the present invention.

While it is generally described that all pixels stored in multi-band graphical image 114 are processed, sixteen (16) pixels per performance of the steps of logic flow diagram 200 (FIG. 2), some graphical images do not necessarily store pixels of sequential scanlines contiguously. Therefore, in one embodiment, image processor 110 (FIG. 1) processes in each performance of the steps of logic flow diagram 200 (FIG. 2) sixteen (16) pixels of a particular scanline represented by multi-band graphical image 114 (FIG. 1). In this embodiment, image processor 110 processes each scanline of multi-band graphical image 114 in sequence.

It is appreciated that scanlines of a particular graphical image represented by multi-band graphical image 114 sometimes has a number of pixels which is not evenly divisible by sixteen. In such circumstances, image processor 110 processes any number of pixels of multi-band graphical image 114 from one to fifteen in the manner described above with respect to logic flow diagram 200 (FIG. 2) while ignoring excess bytes of double data words 302A-F.

Processor 102

Processor 102 is shown in greater detail in FIG. 5 and is described briefly herein and more completely in U.S. patent application Ser. No. 08/236,572 by Timothy J. Van Hook, Leslie Dean Kohn, and Robert Yung, filed Apr. 29, 1994 and entitled "A Central Processing Unit with Integrated Graphics Functions" (the '572 application) which is incorporated in its entirety herein by reference. Processor 102 includes a prefetch and dispatch unit (PDU) 46, an instruction cache 40, an integer execution unit (IEU) 30, an integer register file 36, a floating point unit (FPU) 26, a floating point register file 38, and a graphics execution unit (GRU) 28, coupled to each other as shown. Additionally, processor 102 includes two memory management units (IMMU & DMMU) 44a–44b, and a load and store unit (LSU) 48, which in turn includes data cache 120, coupled to each other and the previously described elements as shown. Together, the components of processor 102 fetch, dispatch, execute, and save execution results of computer instructions, e.g., computer instructions of image processor 110 FIG. 1), in a pipelined manner.

PDU 46 (FIG. 5) fetches instructions from memory 104 (FIG. 1) and dispatches the instructions to IEU 30 (FIG. 5), FPU 26, GRU 28, and LSU 48 accordingly. Prefetched instructions are stored in instruction cache 40. IEU 30, FPU 26, and GRU 28 perform integer, floating point, and graphics operations, respectively. In general, the integer operands and results are stored in integer register file 36, whereas the floating point and graphics operands and results are stored in floating point register file 38. Additionally, IEU 30 also performs a number of graphics operations, and appends address space identifiers (ASI) to addresses of load/store instructions for LSU 48, identifying the address spaces being accessed. LSU 48 generates addresses for all load and store operations. The LSU 48 also supports a number of load and store operations, specifically designed for graphics data. Memory references are made in virtual addresses. MMUs 44a–44b map virtual addresses to physical addresses.

PDU 46, IEU 30, FPU 26, integer and floating point register files 36 and 38, MMUs 44a–44b, and LSU 48 can be coupled to one another in any of a number of configurations as described more completely in the '572 application. As described more completely in the '572 application with respect to FIGS. 8a–8d thereof, GRU 28 performs a number of distinct partitioned multiplication operations and partitioned addition operations. Various partitioned operations used by image processor 110 (FIG. 1) are described more completely below.

As described above, processor 102 includes four (4) separate processing units, i.e., LSU 48, IEU 30, FPU 26, and GRU 28. Each of these processing units is described more completely in the '572 application. These processing units operate in parallel and can each execute a respective computer instruction while others of the processing units executes a different computer instruction. GRU 28 executes the merge operations described above.

In one embodiment, processor 102 is the UltraSPARC processor available from SPARC International, Inc., and computer system 100 (FIG. 1) is the UltraSPARCstation available from Sun Microsystems, Inc. of Mountain View, Calif. Sun, Sun Microsystems, and the Sun Logo are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

The above description is illustrative only and is not limiting. The present invention is limited only by the claims which follow.

What is claimed is:

1. A method for separating at least one multiple-band pixels which have an integer number, n, of components of n respective bands into n buffers each of which stores the components of the at least one pixels, the method comprising:

(a) storing the at least one multiple-band pixels in a pixel sequence in at least two data words, each of which stores a positive integer number, m, of components of the at least one multiple-band pixels;

(b) merging a first half of the at least two data words with a second half of the at least two data words to form two or more intermediate data words which collectively store the components of the at least one multiple-band pixels in an interleaved format;

(c) repeating step (b) to form at least two sifted data words, each of which stores m components of the at least one multiple-band pixels and which collectively store contiguously all components of each of the bands of the at least one multiple-band pixels; and (d) sorting the components of each of the bands such that the components of each band is stored contiguously in at least two sorted data words in the pixel sequence.

2. The method of claim 1 wherein the quotient of m divided by n is non-integer.

3. The method of claim 1 wherein step (d) comprises:

merging components of a selected one of the bands which correspond to odd ones of the multiple-band pixels in odd numbered positions in the pixel sequence with components of the selected band which correspond to even ones of the multiple-band pixels in even numbered positions in the pixel sequence.

4. A computer readable medium useful in association with a computer which includes a processor and a memory, the computer readable medium including computer instructions which are configured to cause the computer to separate at least one multiple-band pixels which have an integer number, n, of components of n respective bands into n buffers each of which stores the components of the at least one pixels by performing the steps of:

(a) storing the at least one multiple-band pixels in a pixel sequence in at least two data words, each of which stores a positive integer number, m, of components of the at least one multiple-band pixels;

(b) merging a first half of the at least two data words with a second half of the at least two data words to form two or more intermediate data words which collectively store the components of the at least one multiple-band pixels in an interleaved format;

(c) repeating step (b) to form at least two sifted data words, each of which stores m components of the at least one multiple-band pixels and which collectively store contiguously all components of each of the bands of the at least one multiple-band pixels; and (d) sorting the components of each of the bands such that the components of each band is stored contiguously in at least two sorted data words in the pixel sequence.

5. The computer readable medium of claim 4 wherein the quotient of m divided by n is non-integer.

6. The computer readable medium of claim 4 wherein step (d) comprises:

merging components of a selected one of the bands which correspond to odd ones of the multiple-band pixels in odd numbered positions in the pixel sequence with components of the selected band which correspond to even ones of the multiple-band pixels in even numbered positions in the pixel sequence.

7. A computer system comprising:

a processor;

a memory operatively coupled to the processor; and a pixel format converter which executes in the processor from the memory and which, when executed by the processor, separates at least one multiple-band pixels which have an integer number, n, of components of n respective bands into n buffers each of which stores the components of the at least one pixels by performing the steps of:

(a) storing the at least one multiple-band pixels in a pixel sequence in at least two data words, each of which stores a positive integer number, m, of components of the at least one multiple-band pixels;

(b) merging a first half of the at least two data words with a second half of the at least two data words to form two or more intermediate data words which collectively store the components of the at least one multiple-band pixels in an interleaved format;

(c) repeating step (b) to form at least two sifted data words, each of which stores m components of the at least one multiple-band pixels and which collectively store contiguously all components of each of the bands of the at least one multiple-band pixels; and (d) sorting the components of each of the bands such that the components of each band is stored contiguously in at least two sorted data words in the pixel sequence.

8. The computer system of claim 7 wherein the quotient of m divided by n is non-integer.

9. The computer system of claim 7 wherein step (d) comprises:

merging components of a selected one of the bands which correspond to odd ones of the multiple-band pixels in odd numbered positions in the pixel with components of the selected band which correspond to even ones of the multiple-band pixels in even numbered positions in the pixel sequence.

* * * * *